United States Patent
Wang et al.

(10) Patent No.: US 11,600,273 B2
(45) Date of Patent: Mar. 7, 2023

(54) SPEECH PROCESSING APPARATUS, METHOD, AND PROGRAM

(71) Applicant: NEC Corporation, Tokyo (JP)

(72) Inventors: Qiongqiong Wang, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 192 days.

(21) Appl. No.: 16/969,035

(22) PCT Filed: Feb. 14, 2018

(86) PCT No.: PCT/JP2018/005057
§ 371 (c)(1),
(2) Date: Aug. 11, 2020

(87) PCT Pub. No.: WO2019/159253
PCT Pub. Date: Aug. 22, 2019

(65) Prior Publication Data
US 2021/0027778 A1    Jan. 28, 2021

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/02* (2013.01); *G10L 15/063* (2013.01); *G10L 15/32* (2013.01);
(Continued)

(58) Field of Classification Search
CPC ....... G10L 15/22; G10L 15/02; G10L 15/063; G10L 15/32; G10L 17/06; G10L 2015/0635; G10L 2015/227
See application file for complete search history.

(56) References Cited

U.S. PATENT DOCUMENTS

| 2015/0095026 A1 | 4/2015 | Bisani et al. |
| 2015/0179189 A1* | 6/2015 | Dadu ............... G10L 15/20 704/275 |
| 2017/0025121 A1 | 1/2017 | Tang |

FOREIGN PATENT DOCUMENTS

| JP | H10-232691 A | 9/1998 |
| JP | H11-305792 A | 11/1999 |

(Continued)

OTHER PUBLICATIONS

P. Heracleous, J. Even, C. T. Ishi, T. Miyashita and N. Hagita, "Fusion of standard and alternative acoustic sensors for robust automatic speech recognition," 2012 IEEE International Conference on Acoustics, Speech and Signal Processing (ICASSP), 2012, pp. 4837-4840, doi: 10.1109/ICASSP.2012.6289002. (Year: 2012).*

(Continued)

*Primary Examiner* — Paras D Shah
*Assistant Examiner* — Philip H Lam

(57) ABSTRACT

The speech processing apparatus 100 includes an air microphone speech recognition unit 101 which recognizes speech from an air microphone 200 acquiring speech through air, a wearable microphone speech recognition unit 102 which recognizes speech from a wearable microphone 300, a sensing unit 103 which measures environmental conditions, a weight decision unit 104 which calculates the weights for recognition results of the air microphone speech recognition unit 101 and the wearable microphone speech recognition unit 102 on the basis of the environmental conditions, and a combination unit 105 which combines the recognition results outputted from the air microphone speech recognition unit 101 and the wearable microphone speech recognition unit 102, using the weights.

6 Claims, 3 Drawing Sheets

(51) Int. Cl.
*G10L 15/02* (2006.01)
*G10L 15/06* (2013.01)
*G10L 15/32* (2013.01)
*G10L 17/06* (2013.01)

(52) U.S. Cl.
CPC ...... *G10L 17/06* (2013.01); *G10L 2015/0635* (2013.01); *G10L 2015/227* (2013.01)

(56) References Cited

FOREIGN PATENT DOCUMENTS

| | | |
|---|---|---|
| JP | 2003-264883 A | 9/2003 |
| JP | 2004-198831 A | 7/2004 |
| JP | 2005-244968 A | 9/2005 |
| JP | 2006-276604 A | 10/2006 |
| JP | 2007-041371 A | 2/2007 |
| JP | 2012-145636 A | 8/2012 |

OTHER PUBLICATIONS

M. B. Trawicki, M. T. Johnson, A. Ji and T. S. Osiejuk, "Multi-channel speech recognition using distributed microphone signal fusion strategies," 2012 International Conference on Audio, Language and Image Processing, 2012, pp. 1146-1150, doi: 10.1109/ICALIP.2012.6376789. (Year: 2012).*

International Search Report for PCT Application No. PCT/JP2018/005057, dated May 15, 2018.

Written opinion for PCT Application No. PCT/JP2018/005057, dated May 15, 2018.

J. Ming, T. J. Hazen, J. R. Glass, and D. A. Reynolds, "Robust speaker recognition in noisy conditions", Audio, Speech, and Language Processing, IEEE Transactions, vol. 15, No. 5, Jul. 2007, pp. 1711-1723, USA.

S. Tsuge, S. Kuroiwa, "Speaker recognition using multiple types of speech", The Seventh Symposium on Biometrics, Recognition and Authentication, Nov. 13-14, 2017 at National Institute of Advanced Industrial Science and Technology, pp. 47-48 JAPAN.

E. Georgati, T. May, S. Par., et al. "Speaker Distance Detection Using a Single Microphone", IEEE Transactions on Audio, Speech, and Language Processing, vol. 19, No. 7, Sep. 2011, pp. 1949-1961 USA.

J.G. Fiscus, "A post-processing system to yield reduced word error rates: Recognizer Output Voting Error Reduction (ROVER)", Automatic Speech Recognition and Understanding, 1997, pp. 347-354, USA.

Tsuge, Satoru et al., Speaker verification method using bone-conduction and air-conduction speech, 2009 International Symposium on Intelligent Signal Processing and Communication Systems (ISPACS2009), IEEE, Feb. 9, 2009, pp. 449-452, ISBN:978-1-4244-5016-9.

Extended European Search Report for EP Application No. 18906526.1 dated Jan. 15, 2021.

Dupont et al., "Combined use of close-talk and throat microphones for improved speech recognition under non-stationary background noise.", ROBUST—COST278 and ISCA Tutorial and Research Workshop ITRW Onrobustness Issues in Conversational Interaction, Aug. 30, 2004, XP002311265.

Heracleous et al., "Fusion of standard and alternative acoustic sensors for robust automatic speech recognition", 2012 IEEE International Conference on Acoustics, Speech and Signal Processing (ICASSP 2012) : Kyoto, Japan, Mar. 25-30, 2012, IEEE, Piscataway, NJ, Mar. 25, 2012, pp. 4837-4840, XP032228238, DOI: 10.1109/ICASSP.2012.6289002 ISBN: 978-1-4673-0045-2.

Sahidullah et al., "Robust Voice Liveness Detection and Speaker Verification Using Throat Microphones", IEEE/ACM Transactions on Audio, Speech, and Language Processing, IEEE, USA, vol. 26, No. 1, Oct. 6, 2017, pp. 44-56, XP058385041,ISSN: 2329-9290, DOI:10.1109/TASLP.2017.2760243.

Sahidullah et al., "Robust Speaker Recognition with Combined Use of Acoustic and Throat Microphone Speech", Interspeech 2016, vol. 2016, Sep. 8, 2016, pp. 1720-1724, XP055762042, ISSN: 1990-9772, DOI:10.21437/InterSpeech.2016-1153.

Trawick et al., "Multichannel speech recognition using distributed microphone signal fusion strategies", Audio, Language and Image Processing (ICALIP), 2012 international Conference On, IEEE, Jul. 16, 2012, pp. 1146-1150, XP032278129, DOI: 10.1109/ICALIP.2012.6376789 ISBN: 978-1-4673-0173-2.

Japanese Office Communication for JP Application No. 2020-538869 dated Oct. 5, 2021 with English Translation.

EP Office Action for EP Application No. 18906526.1 dated Dec. 16, 2022.

\* cited by examiner

SPEECH PROCESSING APPARATUS, METHOD, AND PROGRAM

This application is a National Stage Entry of PCT/JP2018/005057 filed on Feb. 14, 2018, the contents of all of which are incorporated herein by reference, in their entirety.

TECHNICAL FIELD

The present invention relates to a speech processing apparatus, a speech processing method, and a speech processing program.

BACKGROUND ART

The use of a microphone is the most popular method used to acquire voice in speech processing. There are many types of microphones in accordance to different conduction methods, such as air microphones (air conduction microphones), throat microphones, bone microphones, skin microphones and so on. Among all of them, air microphones that acquire voice propagating through air are the most commonly used in the speech processing field. An air microphone picks up the full-band, 20 MHz for example, speech, by using which an appropriate speech processing system obtains good performance. However, it is less immune to environmental noise and far distance from the speech resource, referred to as speaker (refer to NPL1). How to improve the performance in such severe conditions is one of the most challenging topics among speech processing researchers. Especially now with the rapid spread of AI speakers such as Google Assistant, Amazon Alexa and Apple Siri, it has become a hotter and more urgent problem to solve (each of Google, Amazon, Alexa, Apple and Siri is a registered trademark).

A typical example of an air microphone is a sound collecting microphone which is used in a space such as a conference room, a hall or the like. However, usage of an air microphone is not limited to a conference, a convention and so on.

On the other hand, "wearable" devices have been increasing its popularity. Wearable devices are electronic devices for multiple purpose ranging from wireless transmission for communication objectives, music listening, fitness tracking, to biometric authentication. The hardware architecture of wearable devices typically comprises microphones. The microphone in a wearable device is referred to as "wearable microphone" in this specification. Generally, "wearable microphone" being less sensitive to surrounding noise and always on the speaker, i.e. close distance, may be used in noisy environments as mentioned above. However, since high-frequency components conducting through skin or bone attenuate significantly due to transmission loss, the quality of speech signals acquired by wearable microphone is relatively low. NPL 2 shows a wearable microphone performs worse than an air microphone in a speaker recognition application in the clean condition.

CITATION LIST

Patent Literature

[PTL 1]
Japanese Patent Application Laid-Open No. 2003-264883

Non Patent Literature

[NPL 1]
J. Ming, T. J. Hazen, J. R. Glass, and D. A. Reynolds, "Robust speaker recognition in noisy conditions", Audio, Speech, and Language Processing, IEEE Transactions, 2007

[NPL 2]
S. Tsuge, S. Kuroiwa, "Speaker recognition using multiple types of speech", The Seventh Symposium on Biometrics, Recognition and Authentication, 2017

[NPL 3]
E. Georgati, T. May, S. Par., et al. "Speaker Distance Detection Using a Single Microphone", IEEE TASLP 2011

[NPL 4]
J. G. Fiscus, "A post-processing system to yield reduced word error rates: Recognizer Output Voting Error Reduction (ROVER)", Automatic Speech Recognition and Understanding, 1997

SUMMARY OF INVENTION

Technical Problem

NPL1 which used only an air microphone showed that performance of speech processing was degraded by the effect of noise and the far distance between the air microphone and speakers which generates reverberation noise. It is proved that air microphones used in speech processing are vulnerable to far distance and noise. NPL2 compared in-ear bone microphone (a type of wearable microphones) and air microphone, and proved that in-ear bone microphone is not as competitive as the air microphone in speaker recognition in the clean and close condition.

In order to solve the above-mentioned problem, an aspect of the present invention is a speech processing apparatus using combination of different microphones by taking advantage of each type of microphones.

Additionally, PTL 1 discloses usage of different microphones, i.e. an air conduction sound microphone and a bone conduction sound microphone. However, the apparatus disclosed in PTL 1 adds a speech signal (a voice signal) outputted from the air conduction sound microphone to a speech signal outputted from the bone conduction sound microphone in accordance with the result of noise-level measurement. The apparatus does not take into account the effect of reverberation typically caused when the air conduction sound microphone is distant from the speaker. Addition of speech signals from different microphones, as done in the apparatus, does not necessarily improve the performance of recognition because such operations produce some signal which is quite different form original signals. It should be noted that recognition systems are usually tuned or optimized to the microphone by which speech signals are captured.

Solution to Problem

An exemplary aspect of the speech processing apparatus includes air microphone speech recognition means for recognizing speech from an air microphone acquiring speech through air, wearable microphone speech recognition means for recognizing speech from a wearable microphone, sensing means for measuring environmental conditions including at least a distance between the air microphone and the speaker, weight decision means for calculating the weights for recognition results of the air microphone speech recognition means and the wearable microphone speech recognition means on the basis of the environmental conditions, and combination means for combining the recognition results outputted from the air microphone speech recognition means and the wearable microphone speech recognition means, using the weights.

An exemplary aspect of the speech processing method includes recognizing speech from an air microphone acquiring speech through air, recognizing speech from a wearable microphone, measuring environmental conditions including at least a distance between the air microphone and the speaker, calculating the weights for results of recognizing the speech from the air microphone and from the wearable microphone on the basis of the environmental conditions, and combining the results of recognizing the speech from the air microphone and from the wearable microphone, using the weights.

An exemplary aspect of the speech processing program causes a computer to execute recognizing speech from an air microphone acquiring speech through air, recognizing speech from a wearable microphone, measuring environmental conditions including at least a distance between the air microphone and the speaker, calculating the weights for results of recognizing the speech from the air microphone and from the wearable microphone on the basis of the environmental conditions, and combining the results of recognizing the speech from the air microphone and from the wearable microphone, using the weights.

Advantageous Effects of Invention

According to the present invention, the speech processing apparatus, speech processing method, and program of the present invention can provide better performance for speech processing in severe conditions by taking advantage of each type of microphones.

DESCRIPTION OF EMBODIMENTS

One example embodiment of the present invention will be described below with reference to the figures. The following detailed descriptions are merely exemplary in nature and are not intended to limit the invention or the application and uses of the invention. Furthermore, there is no intention to be bound by any theory presented in the preceding background of the invention or the following detailed description. In addition, the drawings together with the detailed description, serve to explain the principles for the inventive method. The drawings are for illustration and do not limit the application of the technique.

First Example Embodiment

A speech processing apparatus of the first example embodiment can provide high performance of speech processing in severe conditions of noise or far distance between the speaker and the air microphone.

<Configuration of the Speech Processing Apparatus>

Figure 1:
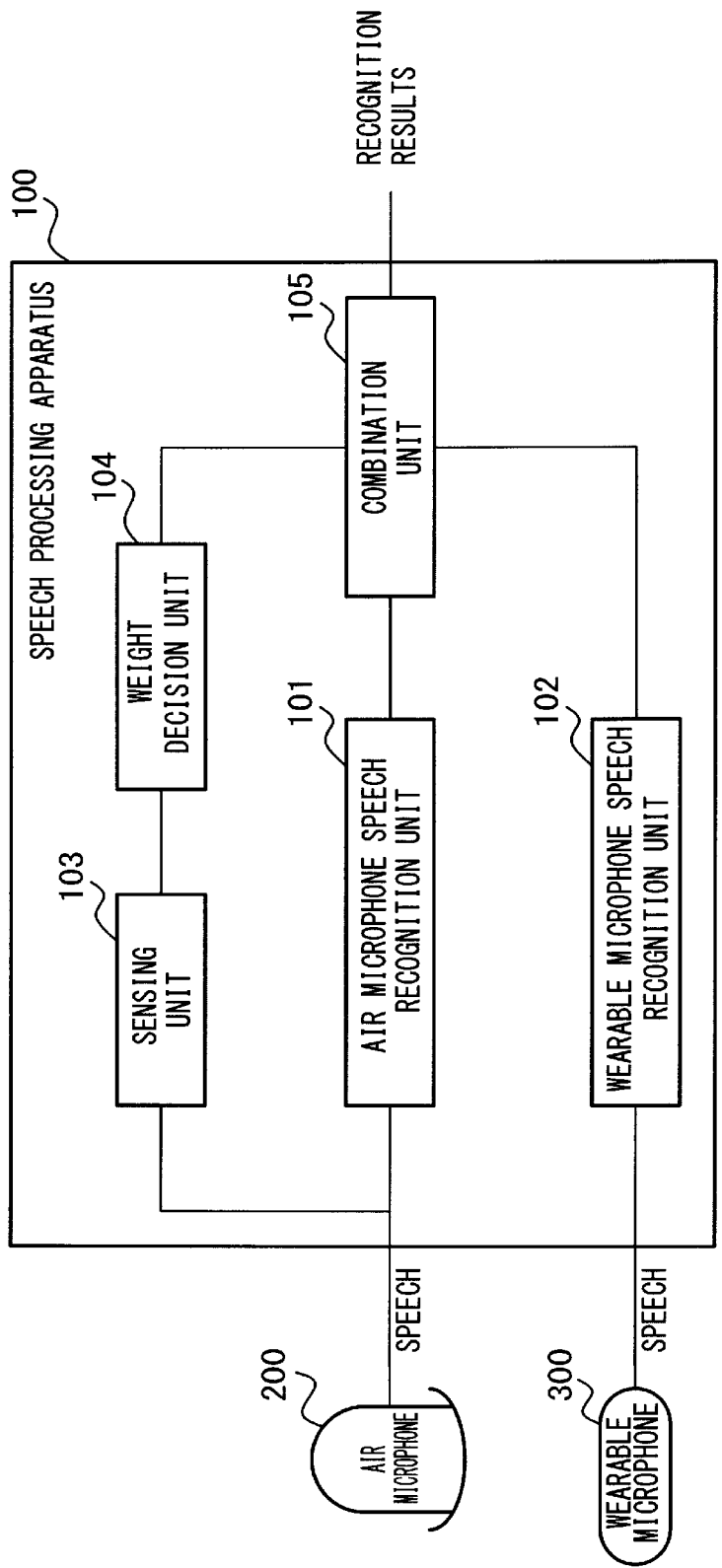
FIG. 1 is a block diagram of a speech processing apparatus of the first example embodiment.

FIG. 1 illustrates a block diagram of a speech processing apparatus 100 of the first embodiment. The speech processing apparatus 100 includes an air microphone speech recognition unit (recognition unit using regular air microphone) 101, a wearable microphone speech recognition unit 102, a sensing unit 103, a weight decision unit 104, and a combination unit 105.

The air microphone speech recognition unit 101 applies speech processing for recognition using the speech data from an air microphone 200. In the case of speaker recognition which is to predict who is speaking, the air microphone speech recognition unit 101 uses the speech data from the air microphone 200 and calculates scores for the potential speakers. Log likelihood is often used as the score here. In case of speech recognition which is to predict the speech contents, the air microphone speech recognition unit 101 uses the speech from the air microphone 200 and calculates the posteriors of linguistic units, e.g. phonemes, syllables, words, as the scores. Any kind of speech processing is possible: speech recognition, emotion recognition, language recognition, dialect recognition, age recognition, gender recognition, etc. Details of all recognition are well-known for a person skilled in the art.

The wearable microphone speech recognition unit 102 applies speech processing for recognition using the speech data from a wearable microphone 300. An example of the wearable microphone 300 is an in-ear microphone. In the case of speaker recognition, the wearable microphone speech recognition unit 102 uses the speech data from the wearable microphone 300 and calculates scores for the potential speakers. In case of speech recognition, the wearable microphone speech recognition unit 102 uses the speech data from the wearable microphone 300 and calculates the posteriors of linguistic units as the scores.

The sensing unit 103 measures the environmental conditions, including signal-noise-ratio (SNR) and distance between the air microphone 200 and the speaker. For SNR measurement, the sensing unit 103 first detects speech and non-speech segments in the air microphone speech, and then calculates the ratio between average amplitudes of speech and non-speech segments. As for distance measurement, plural ways can be used here. For example, in-door positioning sensor, which is embedded together with the wearable microphone 300 and not shown in the figure, acquires the position of the speaker and calculates the distance between it and the known position of the air microphone 200. Another way is speaker distance detection using a single microphone as is disclosed in NPL 3.

The weight decision unit 104 decides weights according to the sensing result by the sensing unit 103. The weights here refer to the weights of using the results outputted from the air microphone speech recognition unit 101 and the wearable microphone speech recognition unit 102. For example, the weights $w_a$ and $w_s$ is calculated using following equations (1) and (2).

$$w_a = a + c * \text{SNR} \quad (1)$$

$$w_s = b + d * \text{distance} \quad (2)$$

Here, "distance" is a distance between the air microphone 200 and the speaker measured by the sensing unit 103. $w_a$ is a weight for each score $s_a$ from the air microphone speech recognition unit 101. $w_s$ is a weight for each score $s_s$ from the wearable microphone speech recognition unit 102. a, b, c and d are constants which can be determined experimentally. c and d are positive.

The example shown here is based on $1^{st}$-order polynomial functions in calculating the weights $w_a$ and $w_s$. However, it is of course possible to use any other functions that are monotonically non-decreasing with respect to SNR and distance.

Another example of such functions is a step function that can take only two values of 0 or 1. In that case, either of the air microphone speech recognition unit 101 or the wearable microphone speech recognition unit 104 is exclusively chosen in accordance with SNR and distance.

The combination unit 105 combines the scores from the air microphone speech recognition unit 101 and the wearable microphone speech recognition unit 102, using the weights outputted from the weight decision unit 104, and output the final recognition result. In the case of speaker recognition, for each potential speakers, the combination unit 105 calculates a combined score s using following equation (3), for example.

$$s=(w_a s_a + w_s s_s)/(w_a + w_s) \quad (3)$$

By comparing the scores of all potential speakers, the combination unit 105 outputs information (data) indicating the speaker who has the highest score as the recognition result. In the case of speech recognition, Recognizer Output Voting Error Reduction (ROVER) in NPL4 can be used in the combination unit 105.

<Operation of the Speech Processing Apparatus>

Next, the operation of the speech processing apparatus 100 will be described with reference to FIG. 2.

In step S11, the air microphone speech recognition unit 101 and the wearable microphone speech recognition unit 102 receive speech data.

In step S12, the air microphone speech recognition unit 101 estimates recognition results by using the speech data from the air microphone 200. Namely, the air microphone speech recognition unit 101 calculates score $s_a$, for example. In the case of speaker recognition, the air microphone speech recognition unit 101 calculates scores for the potential speakers. In the case of speech recognition, emotion recognition, language recognition, dialect recognition, age recognition, or gender recognition, the air microphone speech recognition unit 101 calculates scores for predetermined potential speech, potential emotion, potential words, potential dialect words, potential words for each age, or potential words for each gender.

In step S13, the wearable microphone speech recognition unit 102 estimates recognition results for example, by using the speech data from the wearable microphone 300 in the same way as the air microphone speech recognition unit 101. Namely, the wearable microphone speech recognition unit 102 calculates score $s_s$, for example.

In step S14, the sensing unit 103 measures environmental conditions including SNR and distance between the air microphone and the speaker.

In step S15, the weight decision unit 104 decides the weights for recognition results from the air microphone speech recognition unit 101 and the wearable microphone speech recognition unit 102.

Figure 2:
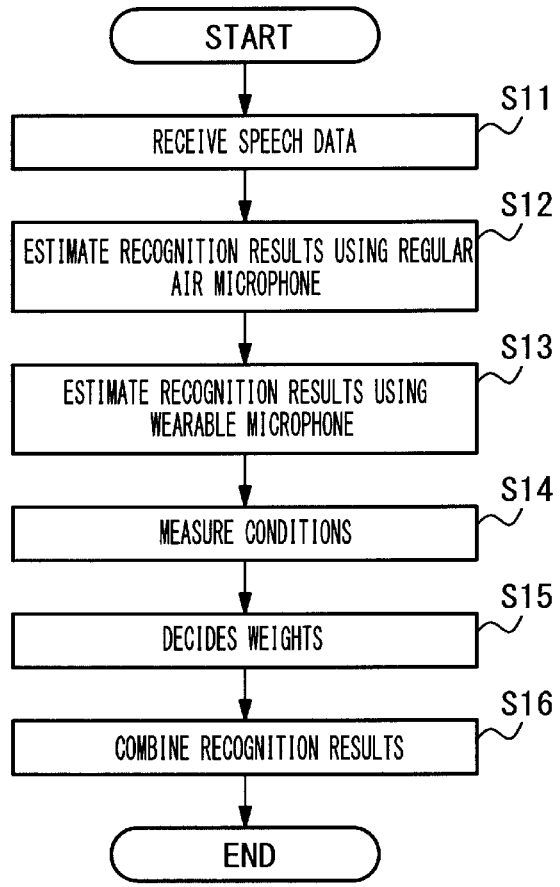
FIG. 2 is a flowchart illustrating an operation of the speech processing apparatus of the first example embodiment.

Note that the order of steps A02-A03 and steps A04-A05 can be switched, not limited to the form presented in FIG. 2. Step S12 and step S13 can be also switched.

In step S16, the combination unit 105 combines the recognition results outputted from the air microphone recognition speech unit 101 and the wearable microphone speech recognition unit 102, while reflecting the weights outputted from the weight decision unit 104.

As explained above, the first example embodiment can improve performance of speech processing for recognition in severe conditions. It takes the advantages of both the air microphone 200 that picks up full-band speech and the wearable microphone 300 that is robust to surrounding noise. In other words, the speech processing apparatus, speech processing method, and program of the above example embodiment can provide better performance for speech processing in severe conditions by taking advantage of each type of microphones that the air microphone 200 picks up full-band speech and the wearable microphone 300 is robust to surrounding noise.

As a final point, it should be clear that the process, techniques and methodology described and illustrated here are not limited or related to a particular apparatus. It can be implemented using a combination of components. Also various types of general purpose devise may be used in accordance with the instructions herein. The present invention has also been described using a particular set of examples. However, these are merely illustrative and not restrictive. For example the described software may be implemented in a wide variety of languages such as C/C++, Java, MATLAB and Python etc. Moreover other implementations of the inventive technology will be apparent to those skilled in the art.

The aforementioned example embodiment can be configured in hardware, but it is also possible to implement an example embodiment by a computer program.

Figure 3:
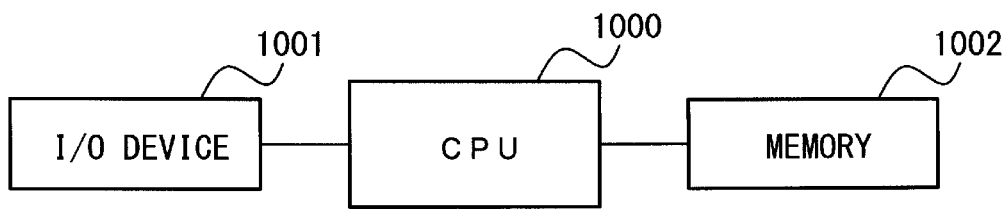
FIG. 3 is a block diagram illustrating a configuration example of an information processing system capable of implementing the functions of the speech processing apparatus.

An information processing system shown in FIG. 3 includes one or more processors such as CPUs (Central Processing Unit) 1000, an I/O (Input/Output) device 1001 and a memory 1002. A magnetic storage medium such as a hard disk, or a semiconductor memory such as a ROM (read only memory) or a flash memory can be used as the memory 1002. The I/O device 1001 can realize functions of an output unit for inputting speech data and an input unit for outputting recognition results.

The memory 1002 stores a program for realizing the function of each unit in the speech processing apparatus 100 shown in FIG. 1. In the memory 1002, an area in which at least a program is stored is a non-transitory tangible storage area (non-transitory tangible media). In addition, the memory 1002 may realize a temporary information storage unit. The CPU 1000 executes processes according to the program stored in the memory 1002 to realize functions of the air microphone speech recognition unit 101, the wearable microphone speech recognition unit 102, the sensing unit 103, the weight decision unit 104, and the combination unit 105 shown in FIG. 1.

Figure 4:
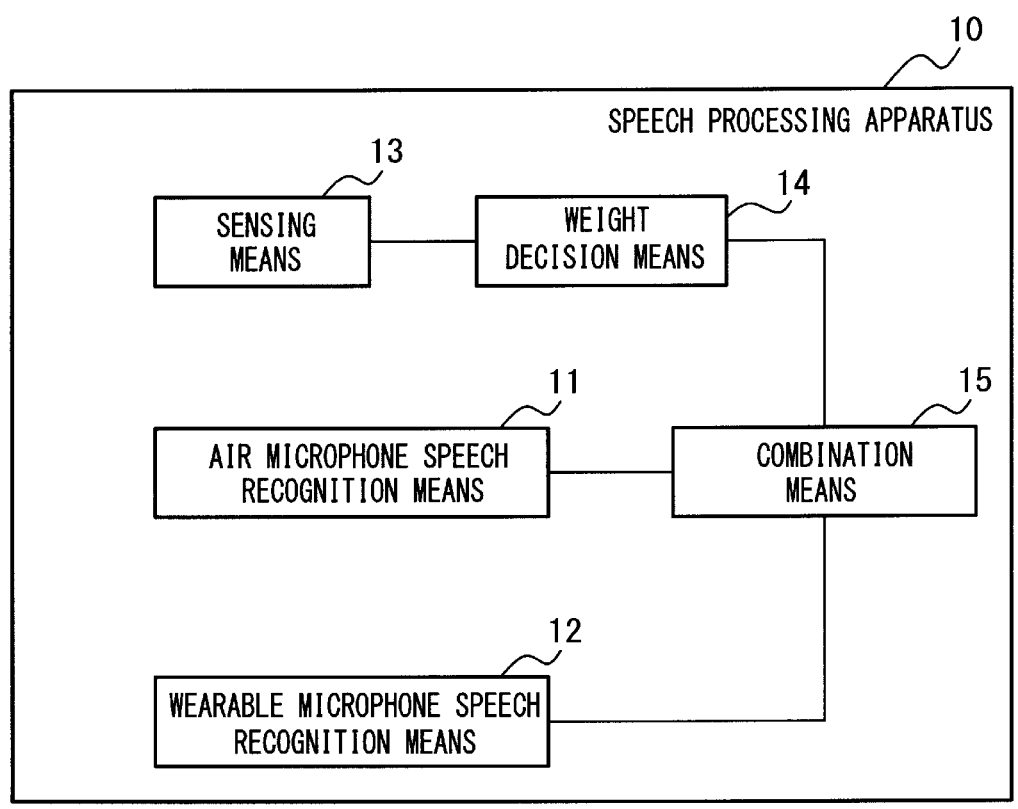
FIG. 4 is a block diagram illustrating main parts of the speech processing apparatus.

FIG. 4 is a block diagram showing main parts of a speech processing apparatus according to the present invention. As shown in FIG. 4, the speech processing apparatus 10 includes air microphone speech recognition means 11 (realized by the air microphone speech recognition unit 101 in the example embodiment) for recognizing speech from an air microphone acquiring speech through air, wearable microphone speech recognition means 12 (realized by the wearable microphone speech recognition unit 102 in the example embodiment) for recognizing speech from a wearable microphone, sensing means 13 (realized by the sensing unit 103 in the example embodiment) for measuring environmental conditions including at least a distance between the air microphone and the speaker, weight decision means 14 (realized by the weight decision unit 104 in the example embodiment) for calculating the weights for recognition results of the air microphone speech recognition means 11 and the wearable microphone speech recognition means 12 on the basis of the environmental conditions, and combination means 15 (realized by the combination unit 105 in the example embodiment) for combining the recognition results outputted from the air microphone speech recognition means 11 and the wearable microphone speech recognition means 12, using the weights.

The foregoing exemplary embodiments may be partly or wholly described in the following supplementary notes, though the structure of the present invention is not limited to such.

(Supplementary note 1) A speech processing apparatus comprising:

air microphone speech recognition means for recognizing speech from an air microphone acquiring speech through air, wearable microphone speech recognition means for recognizing speech from a wearable microphone, sensing means for measuring environmental conditions including SNR and a distance between the air microphone and the speaker, weight decision means for calculating the weights for recognition results of the air microphone speech recognition means and the wearable microphone speech recognition means on the basis of the environmental conditions, and combination means for combining the recognition results outputted from the air microphone speech recognition means and the wearable microphone speech recognition means, using the weights.

(Supplementary note 2) The speech processing apparatus according to Supplementary note 1, wherein the weight decision means determines the weight for the recognition results of the wearable microphone speech recognition means, in accordance with the distance between the air microphone and the speaker.

(Supplementary note 3) The speech processing apparatus according to Supplementary note 2, wherein the weight for the recognition results of the air microphone speech recognition means is monotonically non-decreasing functions, with respect to the distance between the air microphone and the speaker.

(Supplementary note 4) The speech processing apparatus according to any one of Supplementary notes 1 to 3, wherein the air microphone speech recognition means and the wearable microphone speech recognition means perform either of speech recognition, speaker recognition, language recognition, dialect recognition, emotion recognition, gender recognition, age recognition.

(Supplementary note 5) A speech processing method comprising:

recognizing speech from an air microphone acquiring speech through air, recognizing speech from a wearable microphone, measuring environmental conditions including SNR and a distance between the air microphone and the speaker, calculating the weights for results of recognizing the speech from the air microphone and from the wearable microphone on the basis of the environmental conditions, and combining the results of recognizing the speech from the air microphone and from the wearable microphone, using the weights.

(Supplementary note 6) The speech processing method according to Supplementary note 5, wherein the weight for the results of recognizing the speech from the wearable microphone is determined in accordance with the distance between the air microphone and the speaker.

(Supplementary note 7) The speech processing method according to Supplementary note 6, wherein the weight for the results of recognizing the speech from the air microphone is monotonically non-decreasing functions, with respect to the distance between the air microphone and the speaker.

(Supplementary note 8) A speech processing program for causing a computer to execute:

recognizing speech from an air microphone acquiring speech through air, recognizing speech from a wearable microphone, measuring environmental conditions including SNR and a distance between the air microphone and the speaker, calculating the weights for results of recognizing the speech from the air microphone and from the wearable microphone on the basis of the environmental conditions, and combining the results of recognizing the speech from the air microphone and from the wearable microphone, using the weights.

(Supplementary note 9) The speech processing program according to Supplementary note 8, wherein the weight for the results of recognizing the speech from the wearable microphone is determined in accordance with the distance between the air microphone and the speaker.

(Supplementary note 10) The speech processing program according to Supplementary note 9, wherein the weight for the results of recognizing the speech from the air microphone is monotonically non-decreasing functions, with respect to the distance between the air microphone and the speaker.

(Supplementary note 11) A non-transitory computer readable information recording medium storing a speech processing program, when executed by a processor, performs, recognizing speech from an air microphone acquiring speech through air, recognizing speech from a wearable microphone, measuring environmental conditions including at least a distance between the air microphone and the speaker, calculating the weights for results of recognizing the speech from the air microphone and from the wearable microphone on the basis of the environmental conditions, and combining the results of recognizing the speech from the air microphone and from the wearable microphone, using the weights.

(Supplementary note 12) The computer readable information recording medium according to Supplementary note 11, wherein the weight for the results of recognizing the speech from the wearable microphone is determined in accordance with the distance between the air microphone and the speaker.

(Supplementary note 13) The computer readable information recording medium according to Supplementary note 12, wherein the weight for the results of recognizing the speech from the air microphone is monotonically non-decreasing functions, with respect to the distance between the air microphone and the speaker.

While the present invention has been described with reference to the exemplary embodiments and examples, the present invention is not limited to these exemplary embodiments and examples. Various changes understandable by those skilled in the art can be made to the structures and details of the present invention within the scope of the present invention.

REFERENCE SIGNS LIST 10 speech processing apparatus
11 air microphone speech recognition means
12 wearable microphone speech recognition means
13 sensing mean
14 weight decision means
15 combination means
100 speech processing apparatus
101 air microphone speech recognition unit
102 wearable microphone speech recognition unit
103 sensing unit
104 weight decision unit
105 combination unit
200 air microphone
300 wearable microphone
1000 CPU
1001 I/O device
1002 memory

The invention claimed is:

1. A speech processing apparatus comprising:
an air microphone speech recognition unit which recognizes speech from an air microphone acquiring speech through air,
a wearable microphone speech recognition unit which recognizes speech from a wearable microphone,
a sensing unit which measures environmental conditions including at least a distance between the air microphone and a speaker,
a weight decision unit which calculates weights for recognition results of the air microphone speech recognition unit and the wearable microphone speech recognition unit on the basis of the environmental conditions, and
a combination unit which combines the recognition results outputted from the air microphone speech recognition unit and the wearable microphone speech recognition unit, using the weights,
wherein the weight decision unit determines the weight for the recognition results of the wearable microphone speech recognition unit, in accordance with the distance between the air microphone and the speaker, and
wherein the weight for the recognition results of the air microphone speech recognition unit is a monotonically non-decreasing function, with respect to the distance between the air microphone and the speaker.

2. The speech processing apparatus according to claim 1, wherein the air microphone speech recognition unit and the wearable microphone speech recognition unit perform either of speech recognition, speaker recognition, language recognition, dialect recognition, emotion recognition, gender recognition, age recognition.

3. A speech processing method comprising:
recognizing speech from an air microphone acquiring speech through air,
recognizing speech from a wearable microphone,
measuring environmental conditions including at least a distance between the air microphone and a speaker,
calculating weights for results of recognizing the speech from the air microphone and from the wearable microphone on the basis of the environmental conditions, and
combining the results of recognizing the speech from the air microphone and from the wearable microphone, using the weights,
wherein the weight for the results of recognizing the speech from the wearable microphone is determined in accordance with the distance between the air microphone and the speaker, and
wherein the weight for the results of recognizing the speech from the wearable microphone is a monotonically non-decreasing function, with respect to the distance between the air microphone and the speaker.

4. A non-transitory computer readable information recording medium storing a speech processing program, when executed by a processor, executes:
recognizing speech from an air microphone acquiring speech through air,
recognizing speech from a wearable microphone,
measuring environmental conditions including at least a distance between the air microphone and a speaker,
calculating weights for results of recognizing the speech from the air microphone and from the wearable microphone on the basis of the environmental conditions, and
combining the results of recognizing the speech from the air microphone and from the wearable microphone, using the weights, w
herein the weight for the results of recognizing the speech from the wearable microphone is determined in accordance with the distance between the air microphone and the speaker, and
wherein the weight for the results of recognizing the speech from the wearable microphone is a monotonically non-decreasing function, with respect to the distance between the air microphone and the speaker.

5. The speech processing apparatus according to claim 1, wherein the air microphone speech recognition unit and the wearable microphone speech recognition unit perform either of speech recognition, speaker recognition, language recognition, dialect recognition, emotion recognition, gender recognition, age recognition.

6. The speech processing apparatus according to claim 1, wherein each of the air microphone speech recognition unit and the wearable microphone speech recognition unit calculates a score for predetermined potential speech, potential emotion, potential words, potential dialect words, potential words for each age, or potential words for each gender, and
the combination unit combines scores calculated by the air microphone speech recognition unit and the wearable microphone speech recognition unit, using the weights.

* * * * *